Figure 1:
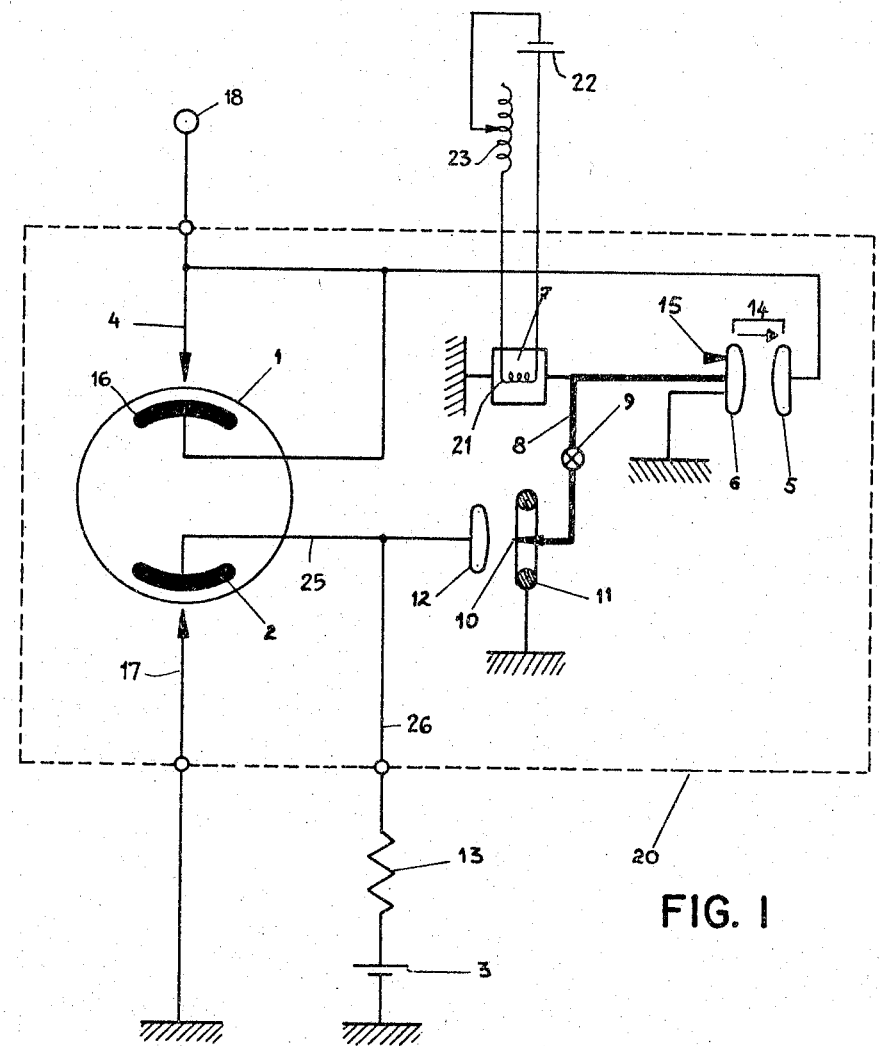

June 6, 1967  N. J. FELICI  3,324,382
ELECTROSTATIC APPARATUS FOR VOLTAGE REGULATON
Filed July 9, 1963

United States Patent Office 3,324,382
Patented June 6, 1967

3,324,382
ELECTROSTATIC APPARATUS FOR VOLTAGE
REGULATION
Noel J. Felici, Grenoble, France, assignor to SAMES, Societe Anonyme de Machines Electrostatiques, Grenoble, France, a French joint-stock company
Filed July 9, 1963, Ser. No. 293,600
Claims priority, application France, July 10, 1962, 4,477, Patent 1,335,581
5 Claims. (Cl. 322—2)

This invention relates to an improved regulator and more particularly to a regulator for the output of a D.C. generator.

Voltage regulators of the type to which the present invention is directed, while of general application, are particularly well suited for use in controlling the output voltages of generators of the electrostatic type. As is well known, such generators customarily include an input electrode, a conveyor member and an input inductor which is supplied with a D.C. potential from a suitable source. Electrical charges on the input electrode are transmitted to a surface of the conveyor and are transferred thereby to an output electrode. In most cases, this output electrode is at a comparatively high positive or negative D.C. voltage.

The regulation of the output voltages of D.C. generators, such as electrostatic generators, for example, or other more conventional generating systems including booster transformers, rectifiers, etc., often has been accomplished heretofore through the use of vacuum tubes or related electronic components. One type of regulator using such components which is of particular utility in the control of the output voltage of an electrostatic generator is disclosed, for example, in Felici U.S. Patent 2,810,878 granted Oct. 27, 1957. Regulators of this type customarily include an electronic circuit for comparing a predetermined fraction of the output voltage with a reference voltage. The difference between the compared voltages is amplified and is then used to adjust a suitable parameter, such as the energizing voltage of the generator, the voltage of the primary, etc., to control the output.

Voltage regulators of the type employed heretofore have exhibited certain disadvantages. For example, in many such regulators difficulties often were encountered in the realization of the desired degree of accuracy to establish an output voltage within predetermined limits. In addition, regulators of the type previously employed frequently were difficult to adjust to enable the rapid and precise control of the output voltage. Furthermore, and this has been of special moment in the regulation of voltage generators of the electrostatic type, the tendency of the output of such generators to increase in many cases has not been completely obviated in many prior regulators.

One general object of this invention, therefore, is to provide a new and improved regulator for controlling the output voltage of a D.C. generator.

More specifically, it is an object of this invention to provide a regulator of the character indicated in which the output voltage is automatically and accurately maintained within a predetermined limit.

Another object of the invention is to provide such regulator in which the controlled voltage is adjustable in a rapid and straightforward manner.

A further object of the invention is to provide a voltage regulator which is of particular utility in the control of a high voltage D.C. generator of the electrostatic type.

Still another object of the invention is to provide a voltage regulator which is extremely economical to manufacture and thoroughly reliable in operation.

In one illustrative embodiment of the invention, the voltage to be regulated is applied across a gap defined by a pair of spaced electrodes. One of these electrodes is stationary, while the other is supported for movement toward the stationary electrode in response to the electric attraction therebetween. This movement is resisted by a restraining mechanism which biases the movable electrode toward a fixed stop member.

As long as the electric attraction between the electrodes is less than the force applied by the restraining mechanism, the movable electrode is maintained against its stop member. Should the regulated voltage increase above a predetermined value, however, the attraction between the electrodes likewise increases and exceeds the force from the restraining mechanism, thereby urging the movable electrode toward the stationary electrode. This movement produces a current in a circuit which is arranged to control one of the parameters acting on the voltage to be regulated such that the voltage again assumes a value corresponding to a condition of equilibrium between the forces acting on the movable electrode.

In accordance with certain particularly advantageous embodiments, the control circuit includes an effluvia or spark gap system having a second pair of electrodes in spaced relationship with each other. One of these latter electrodes is stationary while the other is movable in response to changes in the spacing between the electrodes in the first pair. The space between the second pair of electrodes, and hence the current flow therebetween, varies in accordance with changes in the voltage to be regulated to produce corresponding variations in the parameter controlling the regulated voltage. With this arrangement, the regulated voltage at all times is maintained within a predetermined limit.

In some good embodiments, the restraining mechanism for resisting the electric attraction between the electrodes in the first pair is readily adjustable to similarly adjust the predetermined limit voltage.

Figure 2:
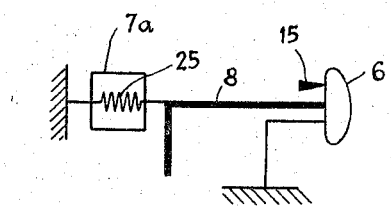

The present invention, as well as further objects and features thereof, will be understood more clearly and fully from the following description of certain preferred embodiments, when read with reference to the accompanying drawings, in which:

FIGURE 1 is a schematic circuit diagram of an electrostatic generator having a voltage regulator in accordance with one illustrative embodiment of the invention; and FIGURE 2 is a fragmentary schematic circuit diagram of a portion of a voltage regulator in accordance with another illustrative embodiment.

Referring to FIGURE 1 of the drawings, there is shown an electrostatic generator having a conveyor 1 which may be of either the conductive or non-conductive type. The conveyor 1 is in the form of a hollow cylinder and is suitably supported for rotation about its axis. The generator is provided with an input inductor 2 in spaced relationship with the inner cylindrical surface of the conveyor. This inductor is supplied with positive D.C. potential from one terminal of a battery 3 or other voltage supply, the opposite terminal of which is grounded. An output inductor 16 also is arranged in spaced relationship with the inner surface of the conveyor and is oriented approximately 180° from the input inductor.

Positioned in opposed relationship with the input inductor 2 is an input ionizer electrode 17. The input electrode 17 is at ground potential and is arranged in juxtaposition with the outer cylindrical surface of the conveyor 1. In a similar manner, an output ionizer electrode 4 is disposed adjacent the output inductor 16 and is spaced from the outer cylindrical surface of the conveyor. The output electrode 4 is electrically connected to the output terminal 18 of the generator and also to the inductor 16 so that these components are at the same potential.

As will be understood, the potential difference between the input inductor 2 and the input electrode 17 promotes the transfer of electrostatic charges from the electrode 17 to the conveyor 1. The output inductor 16 serves as a screen to promote the transfer of charges from the conveyor to the output electrode 4 and the terminal 18. The arrangement is such that a high D.C. output voltage appears at the electrode 4 and the terminal 18 which, in the illustrated embodiment, is of negative polarity.

The structure described thus far is merely illustrative of a conventional electrostatic generator. One characteristic of generators of this type is that, in the absence of regulation, the potential at the output terminal 18 frequently exhibits a tendency to increase continuously unless the charges thereat are removed, as by a suitable load circuit.

In the embodiment of FIGURE 1, the potential at the output electrode 4 is maintained within a predetermined limit by a voltage regulator which includes an electrometer 14. This electrometer comprises a pair of spaced auxiliary electrodes 5 and 6 having substantially convex facing surfaces. The electrode 5 is maintained in a stationary position and is electrically connected to the output electrode 4. The electrode 6, on the other hand, is movable toward and away from the electrode 5, as shown schematically by the arrowhead in FIGURE 1, and is at ground potential. The electrodes 5 and 6, along with the other components of the generator and the regulator, are carried within a container 20, shown schematically in FIGURE 1 by dotted lines. This container carries a compressed gas or other medium having a comparatively high dielectric rigidity. The arrangement is such that the potential difference between the electrodes 5 and 6 corresponds to that across the generator between the input electrode 17 and the output electrode 4, thus producing an electric attraction between the electrodes 5 and 6. This attraction is proportional to the output voltage of the generator and tends to urge the electrode 6 toward the electrode 5.

The electric attraction between the electrodes 5 and 6 is opposed by a restraining mechanism indicated generally at 7. In the FIGURE 1 embodiment, the mechanism 7 includes an electromagnet 21 which is connected to the electrode 6 by one arm of a linkage 8 of electrically conductive material. The electromagnet 21 is energized by a battery 22 and is connected in a series circuit including a potentiometer 23. This potentiometer serves to control the energization of the electromagnet and hence the restraining force exerted on the electrode 6. In cases in which the restraining force is greater than the electric attraction between the electrodes, the electromagnet holds the electrode 6 against a fixed stop 15.

The linkage 8 is arranged to pivot about a spindle 9 in response to movement of the electrode 6 to produce a corresponding movement in a point electrode 10. The point electrode 10 is carried by the arm of the linkage on the side of the spindle opposite that adjacent the arm affixed to the electrode 6. The electrode 10 is movable along the axis of a stationary grounded shielding ring 11 and is in spaced relationship with a cooperating electrode 12. This latter electrode is electrically connected to the common terminal between a conductor 25 leading to the input inductor 2 of the generator and a conductor 26 connected to one side of a resistor 13, the opposite side of which is connected to the positive terminal of the battery 3. The shielding ring 11 is of electrically conductive material and is effective to shield or mask the electrode 10 and thereby prevent the formation of an arc between the electrodes 10 and 12 during the time the electrode 10 is disposed within the ring.

In operation, the electrostatic generator produces a current which leads to the appearance of a comparatively high D.C. voltage at the output electrode 4 and hence across the auxiliary electrodes 5 and 6 of the electrometer 14. The potential difference across these auxiliary electrodes produces a proportional attractive force therebetween which tends to urge the movable electrode 6 to the right, as viewed in FIGURE 1, toward the stationary electrode 5. This action is opposed by the action of the restraining mechanism 7.

Should the output voltage of the generator increase above an initital condition in which the electric attraction between the electrodes 5 and 6 is balanced by the restraining force of the mechanism 7, the electrode 6 moves away from the stop 15 toward the electrode 5 against the action of the restraining mechanism. The attached lever 8 thereby pivots in a clockwise direction about the spindle 9, and the point electrode 10 begins to project beyond the shielding ring 11 toward the electrode 12.

As the point electrode 10 moves away from the shielding ring 11, arcing occurs across the gap between the electrodes 10 and 12 to establish the flow of current therebetween. This current follows a path from the positive terminal of the battery 3, through the resistor 13 and the conductor 26, across the electrodes 12 and 10 and then along the linkage 8 to the grounded electrode 6. The drop in voltage produced by this current across the resistor 13 causes a corresponding reduction in energizing voltage for the generator at the input inductor 2. As the energizing voltage decreases, the voltage at the output electrode 4 also is reduced, thus producing a corresponding reduction in voltage across the electrodes 5 and 6. The electric attraction between the electrodes 5 and 6 thereby decreases until it is again balanced by the restraining force of the mechanism 7. Upon a further drop in the attraction between the electrodes as a result of the decreasing output voltage, the mechanism 7 returns the electrode 6 to its initial position (the position illustrated) against the stop 15. During this return movement, the linkage 8 is effective to carry the point electrode 10 away from the electrode 12 to its position within the shielding ring 11, thereby preventing further current flow between the electrodes 10 and 12 and restoring the voltage applied to the input inductor 2 from the battery 3 to its initial value.

The biasing force exerted on the movable electrode 6 by the restraining mechanism 7 defines the value of a predetermined limit voltage above which the regulator is effective to produce a voltage drop across the resistor 13. As long as the voltage at the output electrode 4 does not exceed this limit voltage, the electric attraction between the auxiliary electrodes 5 and 6 remains in balance with or less than the biasing force of the mechanism 7. Should the output votlage of the generator exceed the limit voltage, however, the electrode 6 moves toward the electrode 5 to produce a corresponding reduction in the output.

The limit voltage is quickly and easily adjustable by varying the setting of the potentiometer 23. Thus, to raise the limit voltage, for example, the potentiometer is adjusted to increase the baising force exerted by the restraining mechanism 7 on the movable electrode 6, thereby requiring a greater attraction between the electrodes 5 and 6 to overcome the biasing force and initiate current flow between the electrodes 10 and 12. Conversely, to lower the limit voltage, the potentiometer is operated to reduce the biasing force, thus requiring a lower voltage across the electrodes 5 and 6 to overcome the bias. The arrangement is such that the limit voltage is accurately adjustable over a wide range to accommodate substantially any desired load at the generator output.

As best shown in FIGURE 2, in some advantageous embodiments an alternative restraining mechanism 7a is employed in place of the restraining mechanism 7 of FIGURE 1. The mechanism 7a comprises an adjustable coil spring 25 which is fixed at one end and is connected at its opposite end to the portion of the linkage 8 leading to the movable electrode 6. The spring 25 supplies the biasing force to the electrode 6 in a manner similar to that described above to define the limit voltage for the regulator. The spring tension is readily adjustable to vary this voltage in accordance with the desired load on the generator, access to the spring being obtained through the use of a suitable stuffing box (not shown) in the container 20.

Although the regulator has been shown and described as having particular utility when used to control the output voltage of a D.C. generator of the electrostatic type, it will be apparent to those skilled in the art that the invention may also be employed advantageously to control other types of generators. Thus, for example, the invention may be used effectively in generators of the type including a primary winding, the regulator controlling the primary voltage to thereby regulate the voltage across the output.

The terms and expressions which have been employed are used as terms of description and not of limitation, and there is no intention in the use of such terms and expressions of excluding any equivalents of the features shown and described or portions thereof, it being recognized that various modifications are possible within the scope of the invention claimed.

What is claimed is:

1. In an electrostatic generator having a D.C. output voltage, in combination, a first pair of spaced electrodes connected across said generator, one of the electrodes in said first pair being stationary and the other being movable toward said one electrode in response to the electrostatic attraction therebetween, electro-mechanical means connected to the movable electrode in said first pair for resisting the movement thereof, means for adjusting said electro-mechanical means to vary its resistance to said movement, a mechanical linkage controlled by said movable electrode, and means including a second pair of spaced electrodes operatively connected between said linkage and said generator for varying said output voltage in response to the predominance of the electrostatic attraction between said first pair of electrodes over the resisting action of said electro-mechanical means until equilibrium therebetween is restored, one of the electrodes in said second pair being stationary and the other being connected to said linkage for movement therewith.

2. In an electrostatic generator including an input inductor supplied with an electrical potential, an input electrode, a conveyor and an output electrode having an output voltage, said conveyor being supported for movement relative to said electrodes for conveying electric charges therebetween, the improvement which comprises a pair of auxiliary electrodes supplied with said output voltage, one of said auxiliary electrodes being movable toward the other auxiliary electrode in response to the electrostatic attraction therebetween, restraining means connected to said one auxiliary electrode for resisting the movement thereof, and means operatively connected between said one auxiliary electrode and the input inductor of said generator for varying said output voltage in response to the predominance of the electrostatic attraction between said auxiliary electrodes over the resisting action of said restraining means.

3. In an electrostatic generator including an input inductor supplied with a D.C. potential, an input electrode, a conveyor and an output electrode having an output voltage, said conveyor being supported for movement relative to said electrodes for conveying electric charges therebetween, the improvement which comprises a first pair of auxiliary electrodes supplied with said output voltage, one of the auxiliary electrodes in said first pair being stationary and the other being movable toward said one auxiliary electrode in response to the electrostatic attraction therebetween, the position of the movable auxiliary electrode varying in accordance with variations in said output voltage from a predetermined value, restraining means connected to the movable auxiliary electrode in said first pair for resisting the movement thereof, and means including a second pair of auxiliary electrodes operatively connected between said movable auxiliary electrode and the input inductor of said generator for maintaining said output voltage at said predetermined value.

4. In an electrostatic generator including an input inductor supplied with a D.C. potential, an input electrode, a conveyor and an output electrode having a D.C. output voltage, said conveyor being supported for movement relative to said electrodes for conveying electric charges therebetween, the improvement which comprises; a first pair of auxiliary electrodes connected across the input and output electrodes of said generator, one of the auxiliary electrodes in said first pair being stationary and the other being movable toward said one auxiliary electrode in response to the electrostatic attraction therebetween, restraining means connected to the movable auxiliary electrode in said first pair for resisting the movement thereof, means for adjusting said restraining means to vary its resistance to said movement, a mechanical linkage controlled by said movable electrode, and circuit means including a second pair of auxiliary electrodes for varying said output voltage in response to the predominance of the electrostatic attraction between said first pair of auxiliary electrodes over the resisting action of said restraining means until equilibrium therebetween is restored, one of the electrodes in said second pair being mechanically connected to the movable electrodes in said first pair.

5. In an electrostatic generator of the character set forth in claim 4, said restraining means including a spring connected to the movable auxiliary electrode in said first pair.

References Cited

UNITED STATES PATENTS

| | | |
|---|---|---|
| 1,605,911 | 11/1926 | Banneitz. |
| 2,836,785 | 5/1958 | Neubert _____ 322—2.1 |
| 2,942,077 | 6/1960 | Diesel. |
| 2,957,061 | 10/1960 | Domeier. |
| 3,082,370 | 3/1963 | Hallidy _____ 322—73 X |
| 3,153,710 | 10/1964 | Ganouna-Cohen et al. |
| | | 317—144 X |

MILTON O. HIRSHFIELD, *Primary Examiner.*

J. J. SWARTZ, *Assistant Examiner.*